United States Patent Office 2,774,609
Patented Dec. 18, 1956

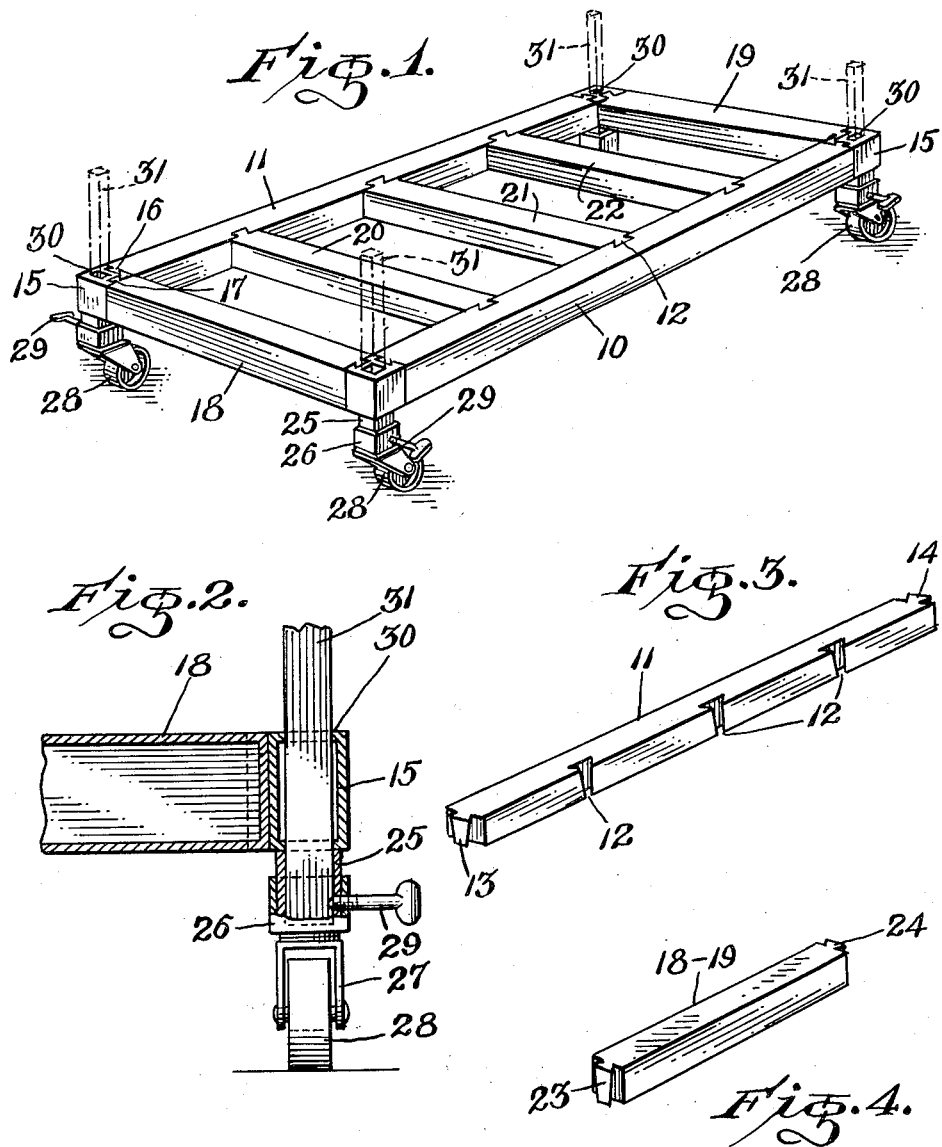

2,774,609
DOLLY WITH DISASSEMBLY FACILITATING MEANS

Raymond C. Winger, Livonia, Mich.

Application January 4, 1954, Serial No. 401,862

1 Claim. (Cl. 280—79.1)

This invention relates to a portable truck.

It is an object of the invention to provide a truck which can be disassembled and stored in a small space for the purpose of being transported to its point of use.

It is another object of the invention to provide in a portable truck an assemblage of parts adapted to be secured together by dovetail joints with corner parts, side and end parts united in tight assembled relation by merely fixing together the joints and wherein intermediate parts are provided to give a tight and rigid assembled structure and wherein caster parts can be easily fitted into or upon the corner parts and held secure by a mere thumb screw and further wherein the corner parts are adapted to receive posts for the purpose of maintaining upon the truck the articles to be transported by the same.

Other objects of the invention are to provide a portable truck formed of an assemblage of parts, which is of simple construction, inexpensive to manufacture, light in weight, easy to assemble, durable, of pleasing appearance, convenient and efficient in use.

For a better understanding of the invention, reference may be had to the following detailed description taken in connection with the accompanying drawing, in which:

Figure 1 is a perspective view of the portable truck with the parts assembled together and the truck adapted for use;

Fig. 2 is an enlarged fragmentary sectional view taken through one corner of the truck;

Fig. 3 is a perspective view of one of the side parts;

Fig. 4 is a perspective view of one of the end and intermediate parts.

Referring now to the figures, 10 represents one of the side parts and 11 represents the other side part. Each side part is provided with a plurality of dovetail grooves 12 formed in one side of the side part and longitudinally spaced from each other. The ends of the side part 10 and of the side part 11 respectively have tapered dovetail projections 13 and 14 at the respective opposite ends thereof. These end projections 13 and 14 can be respectively fitted into corner members 15 which have on two sides tapered dovetail grooves 16 and 17. At the ends of the truck there are inserted between corner members 15 short end pieces 18 and 19. These two end pieces 18 and 19 taken with the side pieces 11 and 12 and the four corner parts 15 form the frame outline of the truck. Intermediate members 20, 21 and 22 are formed similar to the members 18 and 19 and have dovetail projections 23 and 24 which fit respectively into the dovetail grooves 12 on the inner sides of the side members 11 and 10.

In Fig. 4 there is shown one of these short members. These members are of the same size and shape and serve as the end members.

All of the parts are hollow and preferably made of light weight metal.

The corner part 15 has a depending projection 25 to which a castor sleeve 26 is attached. The castor sleeve has a bifurcated fork 27 which is journalled in the lower end of the sleeve 26 and to which roller wheel 28 is journalled. A thumb screw 29 is threaded between the sleeve and the depending projection 25 to secure the castor to the projection 25.

The upper end of the corner part 15 has a square hole 30 into which a corner post 31 is inserted. The corner post is removable.

It is seen that with the parts shaped as above described that the assemblage of the side parts, end parts and intermediate parts when taken with the corner parts 15 will form the assemblage as shown in Fig. 1. The castors are easily connected to the depending projections of the corner parts. It will also be apparent that these parts can be easily disassembled for the purpose of saving space and to permit the truck to be easily transported.

While various changes may be made in the detail construction, it shall be understood that such changes shall be within the spirit and scope of the present invention as defined by the appended claim.

What is claimed is:

A portable truck comprising side frame members having a plurality of longitudinally-spaced vertically-extending dovetail grooves on the inner sides thereof, said side frame members further having dovetail projections on the respective opposite ends thereof, a plurality of short intermediate and end frame members having respectively dovetail projections on the respective opposite ends thereof, corner parts having vertically-extending dovetail grooves adapted to receive the end projections of the side and end frame members, said intermediate frame members being secured by their end projections to the dovetail groove in the inner side of the side frame members, said end frame members being secured between the dovetail grooves in the corner parts, said corner parts having depending projections and squared openings in their upper ends, a castor sleeve adapted to be releasably secured to the depending projection of each corner part and having a thumb screw thereon, a castor fork and roller journaled on the castor sleeve, and corner posts removably secured within the squared openings of the corner parts.

References Cited in the file of this patent

UNITED STATES PATENTS

| 88,435 | Bayston et al. | Mar. 30, 1869 |
| 97,270 | Bradway | Nov. 30, 1869 |
| 122,631 | Millers | Jan. 9, 1872 |
| 754,255 | Sullivan | Mar. 8, 1904 |
| 835,492 | Baker | Nov. 13, 1906 |
| 873,496 | Bryant | Dec. 10, 1907 |
| 940,780 | Bent | Nov. 23, 1909 |
| 1,189,053 | Buchanan | June 27, 1916 |
| 1,844,113 | Beidler et al. | Feb. 9, 1932 |
| 1,999,172 | De Boer | Apr. 30, 1935 |

FOREIGN PATENTS

| 6,206 | Great Britain | June 22, 1832 |
| 24,980 | Great Britain | Oct. 30, 1909 |